United States Patent
Verma

(10) Patent No.: US 9,642,215 B2
(45) Date of Patent: May 2, 2017

(54) OPTICAL SENSORS THAT COMPENSATE FOR AMBIENT LIGHT AND INTERFERENCE LIGHT

(71) Applicant: Intersil Americas LLC, Milpitas, CA (US)

(72) Inventor: Nikhil Verma, Santa Clara, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 0 days.

(21) Appl. No.: 15/040,434

(22) Filed: Feb. 10, 2016

(65) Prior Publication Data

US 2017/0034888 A1 Feb. 2, 2017

Related U.S. Application Data

(60) Provisional application No. 62/197,824, filed on Jul. 28, 2015, provisional application No. 62/221,441, filed on Sep. 21, 2015.

(51) Int. Cl.
*H05B 37/02* (2006.01)
*G01S 7/481* (2006.01)
(Continued)

(52) U.S. Cl.
CPC ......... *H05B 37/0218* (2013.01); *G01D 5/34* (2013.01); *H03M 1/12* (2013.01); *H03M 1/66* (2013.01);
(Continued)

(58) Field of Classification Search
CPC ............... H05B 37/02; H05B 37/0218; H05B 37/0227; H05B 37/0281; G01D 5/34; H03M 1/12; H03M 1/66; G01J 1/44; G01S 17/026; G01S 17/10; G01S 7/497; G01S 7/481
See application file for complete search history.

(56) References Cited

U.S. PATENT DOCUMENTS 7,907,061 B2 * 3/2011 Lin ................... G06F 1/3203
340/686.6
8,222,591 B2 * 7/2012 Lin ..................... G01J 1/44
250/214 DC
(Continued)

*Primary Examiner* — Thai Pham
(74) *Attorney, Agent, or Firm* — Foley & Lardner LLP; Mark J. Danielson

(57) ABSTRACT

Certain embodiments described herein relate to optical sensors including a light detector and including and/or for use with a light source, and methods for use with such optical sensors. Certain embodiments involve detecting an amount of ambient light that is incident on the light detector and producing ambient light detection data indicative thereof. Additionally, such embodiments involve detecting interference light and producing interference light detection data indicative thereof. Further, such embodiments can involve producing an ambient light compensation signal based on the ambient light detection data, producing an interference light compensation signal based on the interference light detection data, and detecting light of interest that is incident on the light detector and outputting proximity detection data indicative thereof. The light of interest is caused by light that reflects off an object that is external to the optical sensor and is within a sense region of the optical sensor.

19 Claims, 8 Drawing Sheets

(51) Int. Cl.
*G01S 17/02* (2006.01)
*H03M 1/12* (2006.01)
*H03M 1/66* (2006.01)
*G01D 5/34* (2006.01)

(52) U.S. Cl.
CPC ..... *H05B 37/0227* (2013.01); *H05B 37/0281* (2013.01)

(56) References Cited

U.S. PATENT DOCUMENTS

| | | | |
|---|---|---|---|
| 8,994,926 B2 * | 3/2015 | Dyer | G01S 7/4876 356/3.01 |
| 2010/0277713 A1 * | 11/2010 | Mimeault | G01S 7/487 356/5.01 |
| 2013/0120761 A1 * | 5/2013 | Dyer | G01S 17/026 356/614 |

* cited by examiner

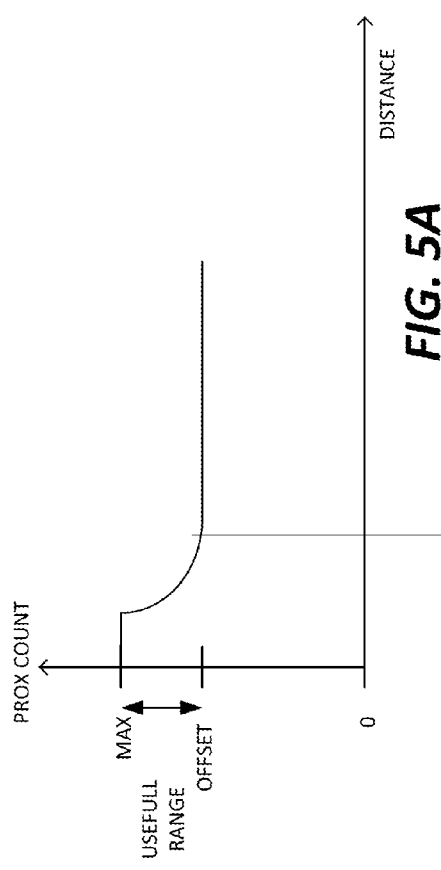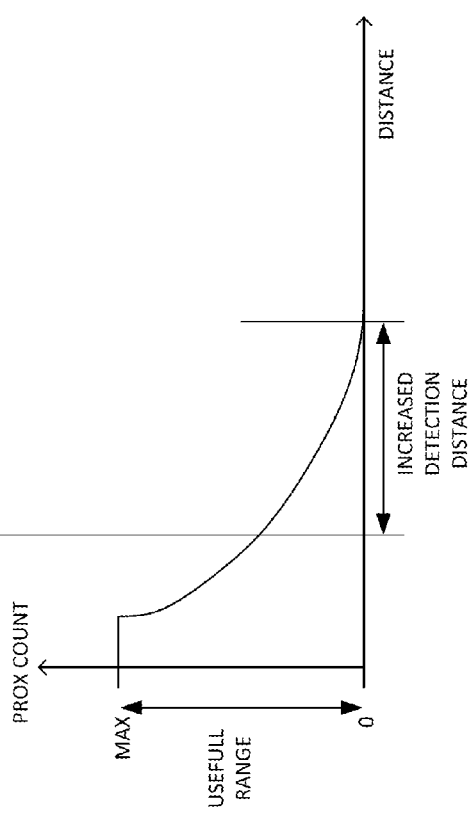

OPTICAL SENSORS THAT COMPENSATE FOR AMBIENT LIGHT AND INTERFERENCE LIGHT

PRIORITY CLAIMS

This application claims priority to U.S. Provisional Patent Application No. 62/197,824, which was filed Jul. 28, 2015, and U.S. Provisional Patent Application No. 62/221,441, which was filed Sep. 21, 2015, both of which are incorporated herein by reference.

BACKGROUND

Optical sensors, such as optical proximity sensors, typically include a light detector and are typically for use with a light source, wherein the light source can be part of the optical sensor or can be external to the optical sensor. Such optical sensors can be used to detect the presence of an object, estimate proximity of an object and/or detect motion of an object, based on the magnitude of light originating from the light source that is reflected from an object and detected by the light detector. The value of these sensors has become more important with the advent of battery-operated handheld devices, such as mobile phones. For example, a fair amount of the energy from a mobile phone battery is used to drive the display, and there is value in turning off the display or backlight when the mobile phone or other device is brought to the user's ear (where it cannot be viewed anyway). Optical proximity sensors have been used for this, and many other applications.

For other examples, there are many other applications in which the presence of an object can be detected with an optical proximity sensor to advantage. These range from sensing when protective covers have been opened on machinery, paper has been positioned correctly in a printer, or an operator's hands are at risk near an operating machine. An optical proximity sensor can also be used as a simple touch or near-touch activated switch, and could be implemented in applications like keyboards or devices that have a plastic housing that is sealed but which allows the light from the source to pass through and be sensed by the detector on the return.

Light from the source to the detector that is not emitted toward the target object, but rather is emitted directly from the source to the detector (i.e., without reflecting off the target object), reduces the capability of the overall device to sense distance. Such light essentially propagates sideways within the package and is considered noise or "light leakage," and contains no information, and thus, can be considered interference. To reduce and preferably prevent light leakage, an opaque light barrier is typically used to optically isolate the light source from the light detector. However, light barriers increase the complexity, cost and size of optical sensors. Additionally, light barriers are often imperfect, resulting in light leaking under, over and/or through the barrier.

Optical sensors are often used with (e.g., placed behind and/or covered by) a cover plate that is glass, plastic, or some other protective light transmissive material. For example, the cover plate can be the glass covering a screen of a mobile phone, portable music player or personal data assistant (PDA), or the glass or plastic covering a screen of a laptop, netbook or tablet computer. When such a cover plate is placed over an optical sensor, the optical sensor is often susceptible to specular reflections. Specular reflections similarly reduce the capability of the overall device to sense proximity, since specular reflections are essentially noise that contain no information, and thus, can be considered interference. Additionally, smudges, makeup, oil and/or other contaminants on the outer surface of a cover plate will cause reflections that contain no information.

In view of the above, there has been a desire to minimize light being emitted directly from a light source to a light detector, as well as to minimize adverse effects of specular reflections and/or other internally reflected light. Conventional attempts to achieve these goals typically relate to modification of the mechanical/structural design of optical sensors.

BRIEF DESCRIPTION OF THE DRAWINGS

FIG. 5A is an exemplary graph that illustrates proximity count versus distance for the optical sensor of FIG. 1, which does not include the compensation for ambient light and interference light in accordance to embodiments of the present invention.

FIG. 5B is an exemplary graph that illustrates proximity count versus distance for an optical sensor that compensates for ambient light and interference light in accordance with embodiments of the present invention.

DETAILED DESCRIPTION

Figure 1:
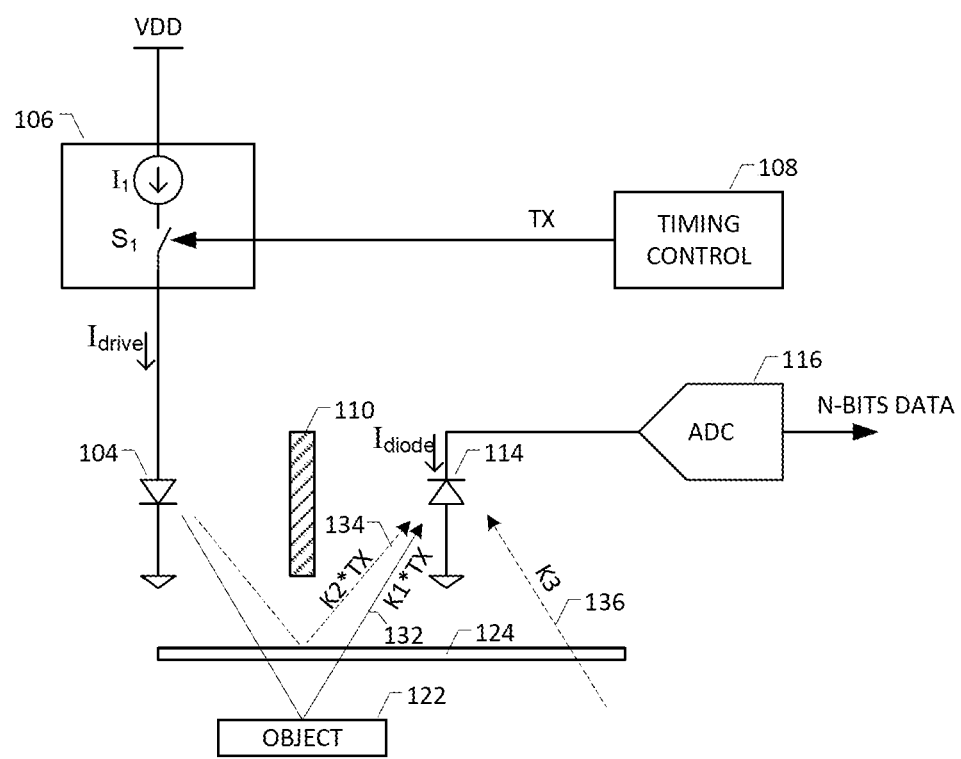
FIG. 1 shows an exemplary optical sensor, which can be a proximity sensor useful to detect the presence of an object, estimate proximity of an object and/or detect motion of an object.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

FIG. 1 shows an exemplary optical sensor 102, which can be a proximity sensor useful to detect the presence of an object, estimate proximity of an object and/or detect motion of an object. The optical sensor 102 includes a light detector 114 (also known as a photodetector), a driver 106, a timing controller 108, and an analog-to-digital converter (ADC) 116. The driver 106 is controlled by a transmit (TX) signal (which can also be referred to as a drive control signal, or simply a control signal) output by the timing controller 108 to selectively drive a light source 104. The light detector 114 generates an analog light detection signal (e.g., a current) that is indicative of the intensity and phase of the light incident on the light detector 114. The ADC converts the analog light detection signal (e.g., a current) generated by the light detector 114 into a digital signal (e.g., an N-bit signal) that can be used to detect the presence, proximity and/or motion of an object 122. The light source 104 can include, for example, one or more light emitting diodes (LEDs), laser diodes, or vacuum cavity surface emitting lasers (VCSELs), which can generally be referred to as light emitting elements. While infrared (IR) light sources are often employed in optical sensors, because the human eye can not detect IR light, the light source can alternatively produce light of other wavelengths. The light detector can be, e.g., one or more photodiode (PD), but is not limited thereto.

The driver 106 is generally shown as including a current source $I_1$ and a switch $S_1$ that is selectively closed based on the transmit (TX) signal output by the timing controller 108, which can be more generally referred to as a controller. When the switch $S_1$ is closed, the current produced by the current source $I_1$ is provided to the anode of the light source 104, to thereby selectively cause light to be emitted. Alternatively, the TX signal can selectively cause a current to be pulled through the light source 104, e.g., by coupling the switch $S_1$ and the current source $I_1$ between the cathode of the light source 104 and a low voltage rail (e.g., ground), to thereby cause light to be emitted. An object within the sense region of the optical sensor and whose proximity, presence and/or motion is being detected by the sensor 102 is represented by block 122. The sense region refers to the region or area within which an object can be detected by the optical sensor. An object can be outside of the sense region, e.g., if the object is too far away from the optical sensor. An object can also be outside of the sense region, even if the object is close to the optical sensor, but is positioned relative to the sensor such that light emitted by the light source is not reflected back to the light detector. In this latter case, the object may be considered to be out of the peripheral field of view (FOV) of the optical sensor, and thus, outside of the sense region.

An opaque light barrier 110 is shown as being located between the light source 104 and the light detector 114, to optically isolate the light source 104 from the light detector 114. However, as mentioned above, light barriers are often imperfect, resulting in light leaking under, over and/or through the barrier. A cover plate 124, which protects and/or disguises the light source 104 and the light detector 114, can be part of the optical sensor 102 or can be external (e.g., adjacent) the optical sensor 102. The cover plate can be made of glass, plastic, or some other light transmissive material. Such a cover plate 124, as mentioned above, may cause specular reflections and/or other internal reflections. Internal reflections can also result from other physical parts included within the optical sensor 102. For the purpose of the description herein, the cover plate 124 is not considered an object within the sense region of the optical sensor, since it is preferably that the optical sensor operates as if the cover plate 124 was not present.

Still referring to FIG. 1, light emitted (also referred to as transmitted) by the light source 104, reflected off the object 122, and incident on the photodetector 114, is represented by line 132. Such light, which can be expressed as K1*TX, is indicative of the light of interest, where K1 is indicative of a magnitude of the light of interest incident on the light detector 114, and TX is the binary value of either 0 or 1. In FIG. 1, light that is generally not of interest (at least with regard to detecting the proximity, presence and/or motion of the object 122) is represented by dashed line 134 and can be caused by specular reflections and/or other internal reflections, reflections from smudges, makeup, oil and/or other contaminants on the outer surface of a cover plate, and/or light leaking under, over and/or through the barrier 110. Such light that is generally not of interest (at least with regard to detecting the proximity, presence and/or motion of the object 122), shall be generally referred to as interference light, and causes the light detector 114 to produce a signal (e.g., a current) that can be expressed as K2*TX, where K2 is indicative of a magnitude of the interference light incident on the light detector 114, and TX is the binary value of either 0 or 1. Such interference light reduces the dynamic range of the optical sensor 102, which reduces the detection range of the optical sensor 102. Interference light, as the term is used herein, does not include ambient light, which may be from sun light, halogen light, incandescent light, fluorescent light, etc. The detection signal (e.g., $I_{diode}$) may also include ambient light, represented by dashed line 136, which can be expressed as K3, that is also not of interest (at least with regard to detecting the proximity, presence and/or motion of the object 122).

As can be appreciated from the above discussion, the light detector 114 (e.g., a photodiode) produces a detection signal (e.g., $I_{diode}$) that can be expressed as $I_{diode}$=K1*TX+ K2*TX+K3. As explained above, with regard to detecting the proximity, presence and/or motion of the object 122, K1*TX is indicative of the light of interest, K2*TX is indicative of the interference light, and K3 is indicative of ambient light. In other words, the detection signal (e.g., $I_{diode}$) produced by the light detector 114 is indicative of light of interest as well as interference light and ambient light, wherein the interference light and ambient light are not of interest.

Figure 2:
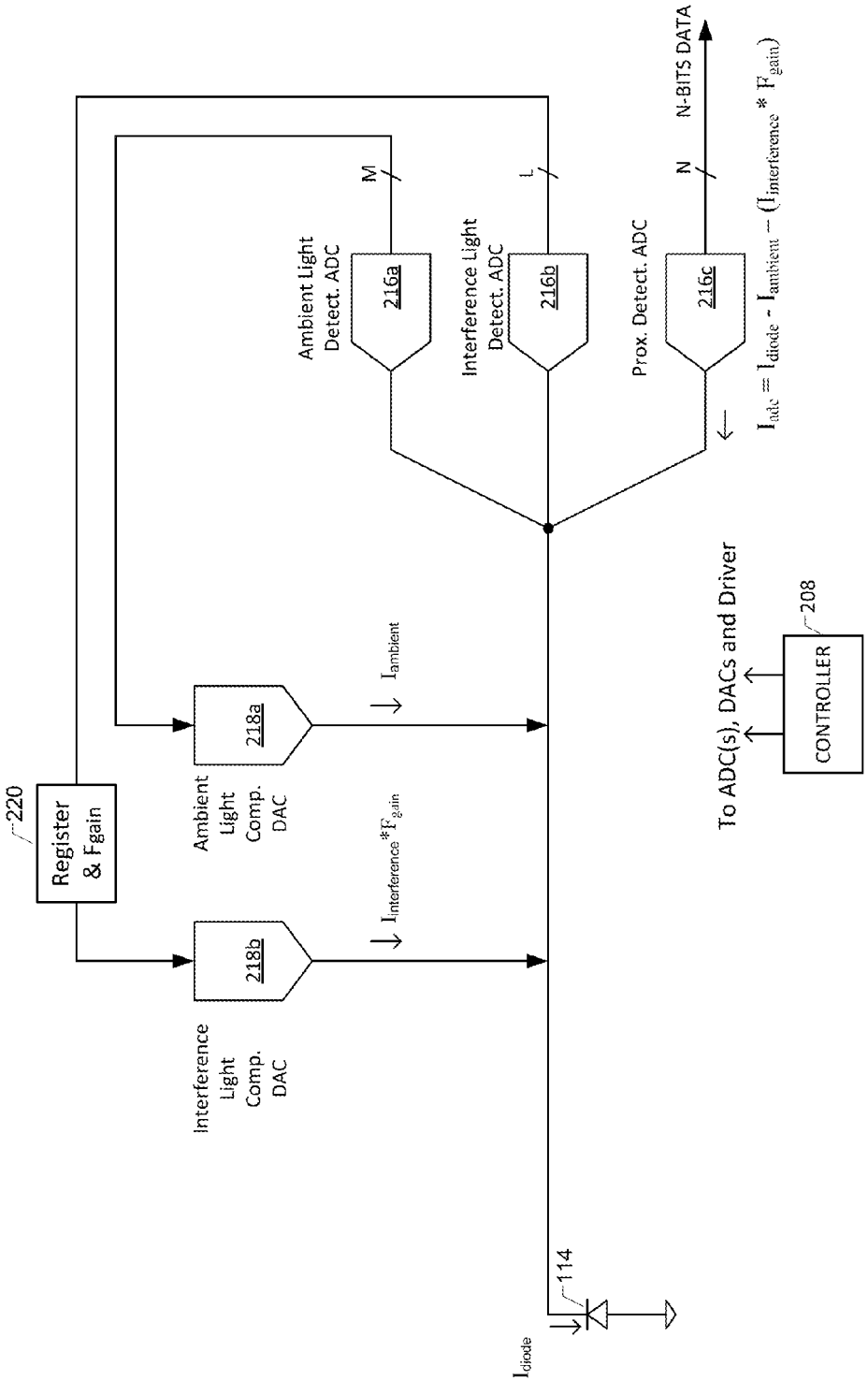
FIG. 2 is a high level block diagram that is used to describe an optical sensor, according to an embodiment of the present invention, which can be used to compensate for both ambient light and interference light.

The high level block diagram of FIG. 2 will now be used to describe an optical sensor 202, according to an embodiment of the present invention, which can be used to compensate for both ambient light and interference light. While not specifically shown in FIG. 2, the optical proximity sensor 202 will also include a light source driver (e.g., similar to the driver 106 in FIG. 1) that is used to drive a light source (e.g., 104 in FIG. 1) with a drive signal (e.g., $I_{drive}$) to selectively emit light. The optical sensor 202 is shown as including a controller 208, which can be used to controller the light source driver (e.g., in a similar manner that the controller 108 controls the driver 106), as well as to control the various analog-to-digital converter(s) and digital-to-analog converters (DACs) of the optical sensor 202, as described below. As will be appreciated from the following discussion, in accordance with certain embodiments, the light source driver of the optical sensor 202 is configured to use at least two different levels to drive the light source, including a first level and a second level, wherein the second level is greater than the first level. The controller 208 can be implemented, e.g., using a microcontroller, and application specific integrated circuit (ASIC), a state-machine, discrete circuitry, or combinations thereof, but is not limited thereto.

Referring to FIG. 2, the optical sensor 202 is shown as including an ambient light detection analog-to-digital converter (ALD-ADC) 216a, an interference light detection analog-to-digital converter (ILD-ADC) 216b, and a proximity detection analog-to-digital converter (ProxD-ADC) 216c. While shown as three separate analog-to-digital converters (ADCs) in FIG. 2, the ALD-ADC 216a, the ILD-ADC 216b and the ProxD-ADC 216c that are shown in FIG. 2 can actually be implemented using the same ADC circuitry (or much of the same ADC circuitry) with a 1:3 demultiplexer at the output of the ADC circuitry, to provide the output of the ADC circuitry to the appropriate signal path. In accordance with specific embodiments of the present invention, the ALD-ADC 216a, the ILD-ADC 216b and the ProxD-ADC 216c can each be implemented as a sigma-delta ADC or a charge balancing ADC, an exemplary implementation of which is described below with reference to FIG. 6. The ALD-ADC 216a, ILD-ADC 216b and ProxD-ADC 216c can all have the same resolution, e.g., M-bits. Alternatively, to reduce (i.e., speed up) analog-to-digital conversion times, the ALD-ADC 216a, ILD-ADC 216b and ProxD-ADC 216c can have different resolutions, e.g., the ProxD-ADC 216c can be an M-bit ADC, the ALD-ADC 216a can be an N-bit ADC, and the ILD-ADC 216b can be an L-bit ADC, where N>M>L (e.g., M=8, N=7, L=6). More generally, in accordance with certain embodiments N≥M≥L. Where the same ADC circuitry (or at least some of the same ADC circuitry) is used to implement the ALD-ADC 216a, ILD-ADC 216b and ProxD-ADC 216c, the different resolutions can be achieved by changing the number of clock cycles used to perform each analog-to-digital conversion and changing the reference currents provided to the ADC circuitry. The resolution will also depend on the type of ADC used. Other variations are also possible and are within the scope of embodiments of the present invention. For simplicity and clarity, for much of the remainder of this description the ALD-ADC 216a, ILD-ADC 216b and ProxD-ADC 216c will be described as if they are separate ADCs, but as just noted above, they can (and likely will be) implemented using the same (or at least some of the same) ADC circuitry. Additionally, for the following discussion, it will be assumed that each ADC includes a counter (e.g., up/down counter 618 in FIG. 6), with the output of the counter being the output of the ADC. This can be better understood from the discussion of FIG. 6, later below.

Still referring to FIG. 2, the optical sensor 202 is also shown as including an ambient light compensation digital-to-analog converter (ALC-DAC) 218a and an interference light compensation digital-to-analog converter (ILC-DAC) 218b. In accordance with an embodiment, the resolution of the ALC-DAC 218a is the same as the resolution of the ALD-ADC 216a, i.e., M-bits; and the resolution of the ILC-DAC 218b is the same as the resolution of the ILD-ADC 216b, i.e., L-bits. The ALC-DAC 218a is shown as receiving the output of the ALD-ADC 216a. The ILC-DAC 218b is shown as receiving the output of the ILD-ADC 216b, after a value of the digital output from the ILC-DAC 218b has been gained up (i.e., increased) within the register 220 which multiplies the digital output of the ILC-DAC 218b by a specified gain factor ($F_{gain}$). It is also possible, and within the scope of an embodiment, that the digital output from the ILC-DAC 218b is stored in a first register, the gain factor ($F_{gain}$) is stored in a second register, and a result of multiplying digital output from the ILC-DAC 218b (stored in the first register) by the gain factor ($F_{gain}$) (stored in the second register) is stored in a third register that is connected to an input of the ILC-DAC 218b. Other variations are also possible and within the scope of embodiments of the present invention. This gain factor ($F_{gain}$) can be determined, e.g., in a factory, during testing of the optical sensor 202 after its manufacture. In accordance with specific embodiments, the gain factor $F_{gain}$ is selected such that the digital value provided to the input of the ILC-DAC 218b is substantially indicative of an amount of interference light that the optical sensor 202 would have detected if the light source 104 were being driven at its normal level (e.g., the second level discussed below) used to emit light towards a target to detect the target's presence, proximity and or motion, but there were no target within the sense region of the optical sensor 202.

The operation of the optical sensor 202, according to certain embodiments, will now be described with reference to the timing diagram in FIG. 3. Reference is also made to components within FIGS. 1 and 2 when explaining the timing diagram of FIG. 3.

Figure 3:
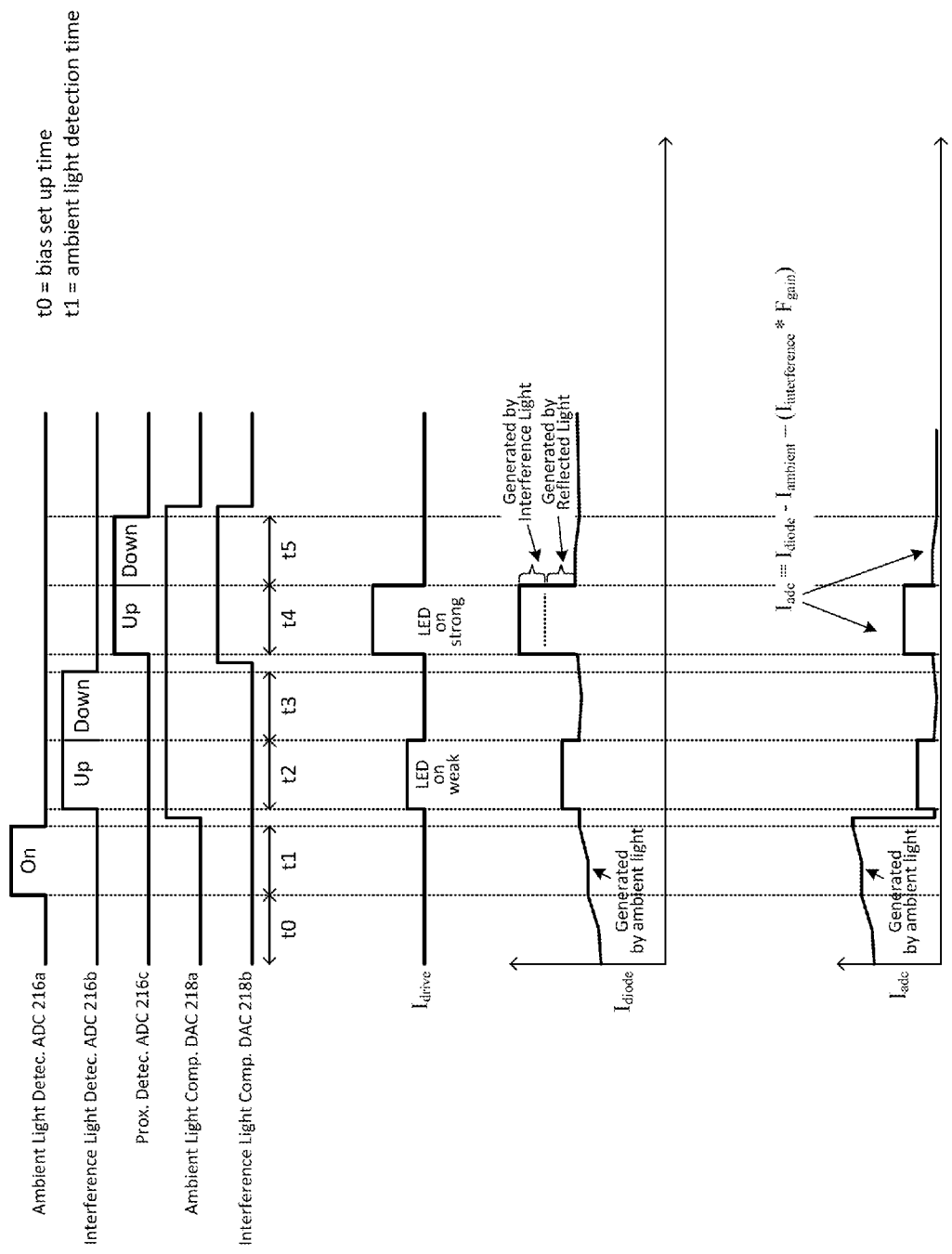
FIG. 3 is an exemplary timing diagram that is useful for describing the operation of the optical sensor introduced in FIG. 2, according to certain embodiments of the present invention.

FIG. 3 illustrates the timing of the ALD-ADC 216a, the ILD-ADC 216b, the ProxD-ADC 216c, the ALC-DAC 218a and the ILC-DAC 216b. FIG. 3 also illustrates the timing and magnitude of the analog driver current ($I_{drive}$) used to drive the light source 104 to emit light. Additionally, FIG. 3 illustrates the timing and magnitude of the analog current generated by the light detector 114 in dependence on light incident on and detected by the light detector, which current is shown as and referred to as $I_{diode}$, and is an example of the light detection signal referred to herein. Finally, FIG. 3 illustrates the timing and magnitude of the analog current provided to the input of the ADCs 216a, 216b and 216c, which current is shown as and referred to as $I_{adc}$. It is noted that the magnitudes shown in FIG. 3 are not precisely drawn to scale, but rather, have been included to generally illustrate the operation of the described embodiments.

In FIG. 3, the time period t0 is the bias setup time for the optical sensor 202, which can follow, e.g., the enabling or turning on of the optical sensor 202.

Still referring to FIG. 3, during the time period t1 (which is the conversion time for the ALD-ADC 216a) the ALD-ADC 216a is on, the ILD-ADC 216b is off, the Prox-ADC 216 is off, the ALC-DAC 218a is off, the ILC-DAC 218b is off, the driver 106 is not driving the light source 104 (and thus, $I_{drive}$ is off), and the light detector 114 produces a photodiode current $I_{diode}$ in response to ambient light that is incident on the light detector 114. This results in the current $I_{adc}$, which is provided to the input of the turned on ALD-ADC 216a, being substantially the same as $I_{diode}$ during the time period t1, as can be appreciated from FIG. 3. The ALD-ADC 216a converts $I_{adc}$ into a digital (e.g., M-bit) value indicative of ambient light incident on the light detector 114. While the ALD-ADC 216a is on it converts the analog photocurrent received at its input into a digital value, which is latched at the end of the conversion time (e.g., by latch 620 in FIG. 6), and provided at the output of the ALD-ADC 216a (even after the ALD-ADC 216a is changed from on to off). At the same time that the ALD-ADC 216a is on and performing its conversion: the ALC-DAC 218a is off and its output is zero; and the ILC-DAC 218b is off and its output is zero.

Still referring to FIG. 3, the time periods t2 and t3 collectively make up the conversion time for the ILD-ADC 216b. More specifically, during the time period t2 the ALD-ADC 216a is off, the ILD-ADC 216b is on and counting up, the Prox-ADC 216 is off, the ALC-DAC 218a is on (and thus, drawing a current indicative of the level of ambient light determined during the time period t1), and the ILC-DAC 218b is off. Also, during the time period t2 the driver 106 is shown as driving the light source 104 with a relatively low amplitude drive signal $I_{drive}$, which results in the $I_{diode}$ current (generated by the light detector 114) being indicative of ambient light and interference light. In accordance with an embodiment, the low amplitude $I_{drive}$ signal is selected, a priori, to cause the light source 104 to emit a relatively weak light signal that causes the light detector 114 to detect interference light, but that does not emit light far enough to reflect off a target object within the sense region of the optical sensor 202. For example, where the light source 104 and the light detector 114 are covered by a light transmissive cover plate (e.g., 124), the low amplitude $I_{drive}$ signal should be sufficient to cause specular reflections, but should not be so strong as to allow light to reflect off an object just beyond the light transmissive cover plate such that the reflected light would be detected by the light detector 114. This results in the current $I_{adc}$ being primarily indicative of the interference light, with the ambient light substantially cancelled out during the time period t2.

Operation during the time period t3 is similar to the operation during the time period t2, except that the drive signal $I_{drive}$ is turned off, and the ILD-ADC 216b counts down (instead of counting up). At the end of the conversion time of the ILD-ADC 216b (i.e., at the end to t3), a latch of the ILD-ADC 216b latches a digital value indicative of the interference light (even after the ALD-ADC 216a is changed from on to off). This digital value, indicative of the interference light, is increased (gained up) by the gain factor $F_{gain}$ so that the digital value provided to the input of the ILC-DAC 218b is substantially indicative of an amount of interference light that the optical sensor 202 would have detected if the light source 104 were being driven at its normal level (i.e., the level used at t4) used to emit light towards a target, but there were no target within the sense region of the optical sensor 202. Such a gain factor $F_{gain}$ can be determined in a factory, preferably after the optical sensor is included in a device or system (e.g., a mobile phone, tablet computer, or laptop computer, just to name a few) so that interference light can be appropriately characterized. As noted above, the gain up can occur within the register 220, which multiplies the digital output of the ILC-DAC 218b by the gain factor $F_{gain}$. Alternatively, as noted above, the gain up can occur using multiple registers, one of which stores the digital value indicative of detected interference light, another of which stores the gain factor $F_{gain}$, and a further one of which stores a result of multiplying the digital value indicative of detected interference light by the gain factor $F_{gain}$.

Still referring to FIG. 3, the time periods t4 and t5 collectively make up the conversion time for the ProxD-ADC 216c. More specifically, during the time period t4 the ALD-ADC 216a is off, the ILD-ADC 216b is off, the ProxD-ADCc 216 is on and counting up, the ALC-DAC 218a is on (and thus, drawing a current indicative of the level of ambient light determined during the time period t1), and the ILC-DAC 218b is on (and thus drawing a current indicative of the level of interference light determined during the time periods t2 and t3). Also, during the time period t4 the driver 106 is shown as driving the light source 104 with its normal amplitude drive signal $I_{drive}$, which results in the $I_{diode}$ current (generated by the light detector 114) being indicative of ambient light, interference light and light emitted by the light source 104 that reflected off an object (e.g., 122 in FIG. 1) and is incident on the light detector 114. Operation during the time period t5 is similar to during the time period t4, except that the drive signal $I_{drive}$ is turned off, and the ILD-ADC 216b counts down (instead of counting up). At the end of the conversion time of the ProxD-ADC 216c (i.e., at the end to t5), a latch of the ProxD-ADC 216c latches a digital value indicative of the proximity of the object (e.g., 122 in FIG. 1) relative to the optical sensor 202, with the ambient light and the interference light substantially compensated for (i.e., substantially cancelled or subtracted out).

In the timing diagram of FIG. 3, the time period t1 can be referred to as an ambient light detection mode or period, the time periods t2 and t3 can be collectively referred to as an interference light detection mode or period, and the time periods t4 and t5 can be collectively referred to as a compensated proximity detection mode or period, or simply as the proximity detection mode or period. In the timing diagram of FIG. 3, the ambient light detection mode is shown as occurring prior to the interference light detection mode, and the interference light detection mode is shown as occurring prior to the proximity detection mode.

Referring back to FIG. 2, the ALD-ADC 216a and the ALC-DAC 218a function to produce a current that is indicative of detected ambient light, which current is connected back to the input where the light detector 114 is connected. However, in practice, the current output by the ALC-DAC 218a may be slightly smaller than the portion of the $I_{diode}$ current that is due to ambient light. This delta, which can be referred to as 'residue 1' gets subtracted out later in the process, in accordance with certain embodiments.

Still referring back to FIG. 2, the ILD-ADC 216b, the register 220, and the ILC-DAC 218b function to produce a current that is indicative of interference light, which current is connected back to the input where the light detector 114 is connected. However, in practice, the current output by the ILC-DAC 218b may be slightly smaller than the $I_{diode}$ current that is due to interference light. This delta, which can be referred to as 'residue 2' gets subtracted out later in the process, in accordance with certain embodiments.

In the exemplary timing diagram of FIG. 3, the light source (e.g., 104) is shown as being driven with a low amplitude (i.e., weak) drive signal during the entire period of time (t2) during which the ILD ADC 216b is on and counting up, and the light source is shown as being driven with the normal amplitude (i.e., strong) drive signal during the entire period of time (t4) during with the ProxD ADC 216c is on and counting up. Alternatively, the light source can be driven with the low amplitude (i.e., weak) drive signal during only a portion (e.g., a first half) of the period of time (t2) during which the ILD ADC 216b is on and counting up. Similarly, the light source can be driven with the normal amplitude (i.e., strong) drive signal during only a portion (e.g., a first half) of the period of time (t4) during with the ProxD ADC 216c is on and counting up. This ensures that the ILD ADC 216b is counting up the entire time that the light detector (e.g., 114) detects interference light, and that the ProxD ADC 216c is counting up the entire time the light detector (e.g., 114) detects light reflected off an object (e.g., 122).

In the embodiments described above with reference to FIG. 3, the ambient light compensation and the interference light offset compensation is performed in the analog domain, i.e., by combining analog signals upstream of the ProxD-ADC 216c. This results in an $I_{adc}$ signal=$I_{diode}-I_{ambient}-(I_{interference}*F_{gain})$ being provided to the ProxD-ADC 216c. Alternatively, it is possible that the interference light offset compensation, or a portion thereof, can be performed in the digital domain, i.e., following conversion by an ADC of an analog detection signal to a digital detection signal. In other words, the interference light offset compensation, or a portion thereof, can be performed by combining digital signals, i.e., by subtracting a digital offset compensation signal from a digital detection signal. An example of a timing diagram for such an alternative embodiment is shown in FIG. 4.

Figure 4:
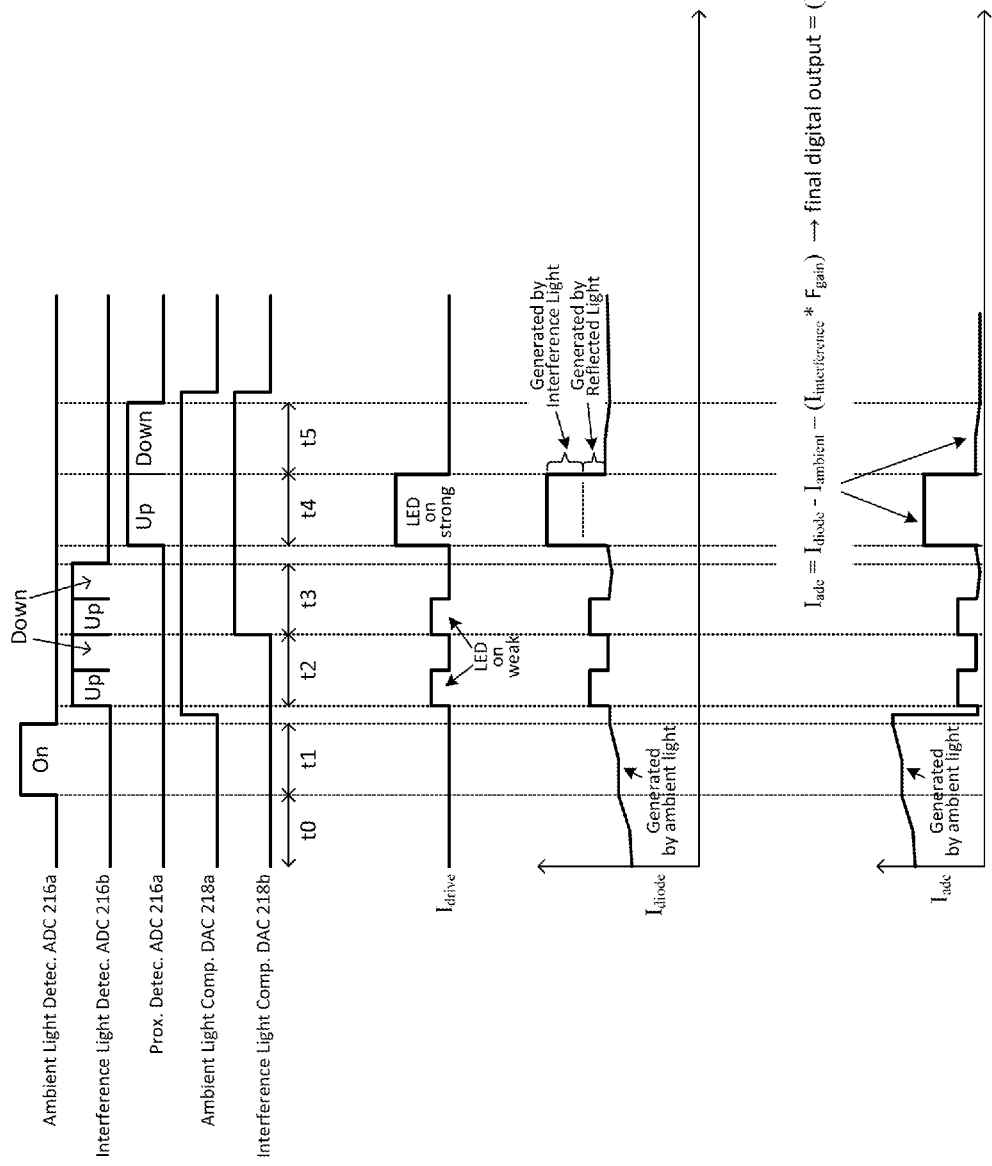
FIG. 4 is a further exemplary timing diagram that is useful for describing the operation of the optical sensor introduced in FIG. 2, according to alternative embodiments of the present invention.

In the embodiments described with reference to FIG. 4, compared to the embodiments described with reference to FIG. 3, the emitting of the weak light signals (for the purpose of characterizing the interference light) is split into two phases, as can be appreciated from the two shorter length low amplitude pulses in the $I_{drive}$ signal shown in FIG. 4. During the first phase, which occurs during the time period t2 in FIG. 4, the L-bit ILD-ADC 216b outputs L/2 bits. The value of the L/2 bits, after being increased in the register 220 by the gain factor $F_{gain}$, is provided to the ILC-DAC 218b. During the second phase, which occurs during the time period t3 shown in FIG. 4, the L-bit ILD-ADC 216b again outputs L/2 bits, and the L/2 bits are provided to the ILC-DAC 218b or stored (after being gained up by the register 220 using the gain factor $F_{gain}$) as a negative value (e.g., using 2's complement). In such an embodiment, the N-bit ProxD ADC 216c will begin its counting from this negative number. If the dynamic range of the L-bit ILD-ADC 216b and the N-bit ProxD-ADC 216c are high enough, then all of the counts during the interference light compensation mode can be digitally subtracted after the conversion. However, in the embodiment described with reference to FIG. 4, the N-bit ProxD-ADC 216 may have less sensitivity than in the embodiment described with reference to FIG. 3.

In a specific embodiment, corresponding to FIG. 4, the time period t3 is used to produce and store a digital value, $Reg_{digital}$, which is indicative of the interference light, and is stored in 2's complement form in a register. In such an embodiment, the final digital output, which is indicative of the proximity of an object relative to the optical sensor with at least a majority of the ambient light and the interference light removed, can be determined using the following equation:

Final digital output=$(Iadc/Irefn)*2^N-Reg_{digital}$, where

N is the resolution of the N-bit ProxD-ADC 216c,

Iadc is the current at the input of the N-bit ProxD-ADC 216c, and

Irefn is the reference current provided to and used by the N-bit ProxD-ADC 216c, which can be better understood from the discussion of FIG. 6, below.

In the above described embodiments, the light detector 114 was generally described as being a photodetector that generates an analog detection signal (e.g., a current) that is indicative of the intensity of the light incident on the light detector 114. However, it is noted that the light detector can also include additionally analog signal processing and/or buffer circuitry, such as an analog-front-end (AFE), a current buffer and/or a filter, but not limited thereto. Collectively, such circuitry can be adapted to produce the analog detection signal indicative of the intensity of the light incident on the light detector 114.

FIG. 5A is an exemplary graph that illustrates proximity count versus distance for the optical sensor 102 of FIG. 1, which does not include the compensation for ambient light and interference light in accordance to embodiments of the present invention. In FIG. 5A, the proximity count represents an output of the ADC 116 in FIG. 1. The offset shown in FIG. 5A, which can be due to ambient light and interference light, adversely affects (i.e., reduces) the useful range of the optical sensor. The extent of the offset is dependent on the extent of the interference light and the ambient light. For example, the offset due to interference light would most likely be largest if a barrier (e.g., 110) between the light source 104 and the light detector 114 was not present. FIG. 5B is an exemplary graph that illustrates proximity count versus distance for an optical sensor that compensates for ambient light and interference light in accordance with embodiments of the present invention. In FIG. 5B the proximity count represents an output of the ProxD-ADC 216c in FIG. 2. Notice how in FIG. 5B the usable range of the optical sensor is increased, as is the detection distance, as compared to FIG. 5A.

Figure 6:
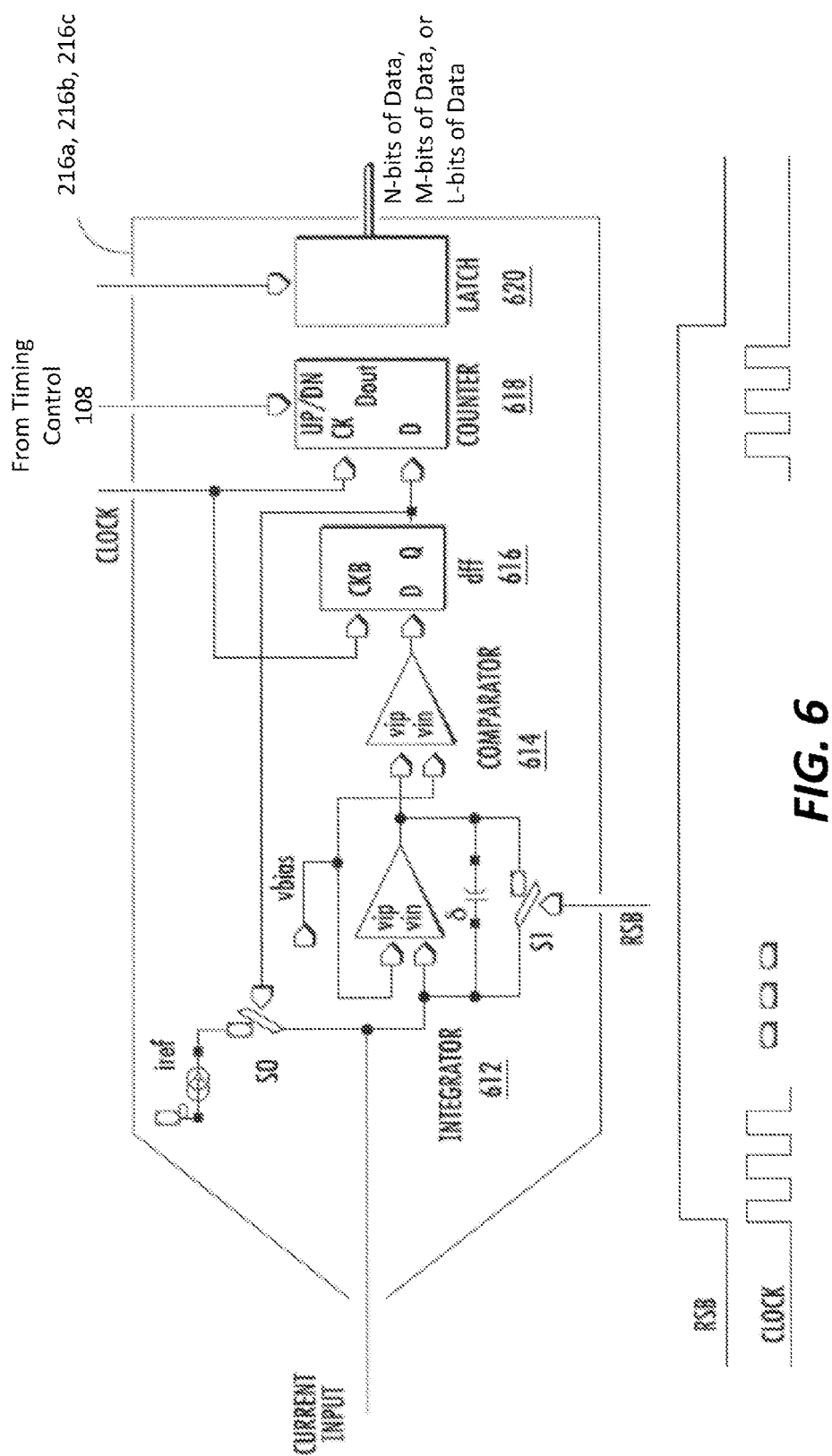
FIG. 6 shows an example implementation of a charge balancing analog-to-digital converter (ADC) that can be used to implement the ADCs shown in FIG. 2.

FIG. 6 shows an example of how the ADCs (216a, 216b and 216c) in FIG. 2 can be implemented as charge balancing ADCs, along with a corresponding exemplary timing diagram. As shown in FIG. 6, each ADC can include an integrator 612, a comparator 614, a D flip-flop (dff) 616, a counter 618, and a latch 620. For the ILD-ADC 216b and the ProxD-ADC 216c, the counter 618 should preferably be an up/down counter, so that the counter can be used to perform a subtraction function. For the ALD-ADC 216a, the counter need only count in one direction, e.g., up.

For each analog-to-digital conversion with N bits, performed by the N-bit ADC 216c, 2^N clock periods are needed. During each conversion time, the number of 1s from the dff 616 are counted, and a charge of Tclock*Iref is delivered to the integrator 612 for each corresponding 1. Here, Tclock is the clock period and Irefn is the reference current associated with the N-bit ADC 216a. According to charge conservation:

$$Iadc*Tclock*2^N=Irefn*Tclock*DataN \qquad \text{(Equation 1A)}.$$

Here, Iadc is the current at the input of the ADC, and DataN is the counter's output at the end of an analog-to-digital conversion time, as latched by the latch 620. The left side of the equation represents the total charge removed from the integrator by the input current, and the right side represents the total charge delivered to the integrator by the reference current. From Equation 1A, the digital output (DataN) of the N-bit ADC 216c can be expressed as:

$$DataN = (Iadc1/Irefn)*2^{\wedge}N - (Iadc2/Irefn)*2^{\wedge}N \qquad \text{(Equation 1B)}$$

$$= [(Iadc1 - Iadc2)/Irefn]*2^{\wedge}N.$$

In Equation 1B, Iadc1 is the average current at the input of the N-bit ADC 216a while the N-bit ADC 216c is on and counting up, and Iadc2 is the average current at the input of the N-bit ADC 216c while the N-bit ADC 216a is on and counting down.

Similarly, for each data (i.e., analog to digital) conversion with L bits, performed by the L-bit ADC 216b, 2^L clock periods are needed. During each conversion time, the number of 1s from the dff 616 are counted, and a charge of Tclock*IrefL is delivered to the integrator 612 for each corresponding 1. Here, Tclock is the clock period and Irefl is the reference current associated with the L-bit ADC 216b. According to charge conservation:

$$Iadc*Tclock*2^L=IrefL*Tclock*DataL \qquad \text{(Equation 1C)}.$$

Here, Iadc is the current at the input of the ADC, and DataL is the counter's output at the end of an analog-to-digital conversion time, as latched by the latch 620. The left side of the equation represents the total charge removed from the integrator by the input current, and the right side represents the total charge delivered to the integrator by the reference current. From Equation 1C, the digital output (DataL) of the L-bit ADC 216b can be expressed as:

$$DataL = (Iadc1/IrefL)*2^{\wedge}L - (Iadc2/IrefL)*2^{\wedge}N \quad \text{(Equation 1D)}$$
$$= [(Iabc1 - Iadc2)/IrefL]*2^{\wedge}L.$$

If needed, irefL can be chosen to be relatively large. In accordance with certain embodiments, if the output counts of the L-bit ADC 216b crosses a specified threshold level, then there can be a determination that the interference light is too high to be compensated for using the embodiments described herein.

For each data (i.e., analog to digital) conversion with M bits, performed by the M-bit ADC 216a, $2^{\wedge}M$ clock periods are needed. During each conversion time, the number of is from the dff 616 are counted, and a charge of Tclock*Irefm is delivered to the integrator 612 for each corresponding 1. Here, Tclock is the clock period and Irefm is the reference current associated with the M-bit ADC 216a. According to charge conservation:

$$Iadc*Tclock*2^{\wedge}M = Irefm*Tclock*DataM \quad \text{(Equation 1E).}$$

From Equation 1E, the digital output (DataM) of the M-bit ADC 216a can be expressed as:

$$DataM = (Iadc/Irefm)*2^{\wedge}M \quad \text{(Equation 1F).}$$

In Equation 1F, Iadc is the average current at the input of the M-bit ADC 216a while the M-bit ADC 216a is on and counting up.

As was explained above, in accordance with an embodiment, various portions of N-bit ADC 216c, the L-bit ADC 216b and the M-bit ADC 216a can be shared, to reduce the size of the circuit, and thus a chip size. For example, the integrator 612, the comparator 614, and the dff 616, and the counter 618, or at least portions thereof, can be shared. Timing control circuits can also be shared.

In accordance with further embodiments, to reduce the amount of ambient light the is incident on the light detector 114, an optical IR rejection filter can be placed over the light detector 114. Such an IR rejection filter may be incorporated into or onto the cover plate 124, or can be below and/or above the cover plate 124.

Figure 7:
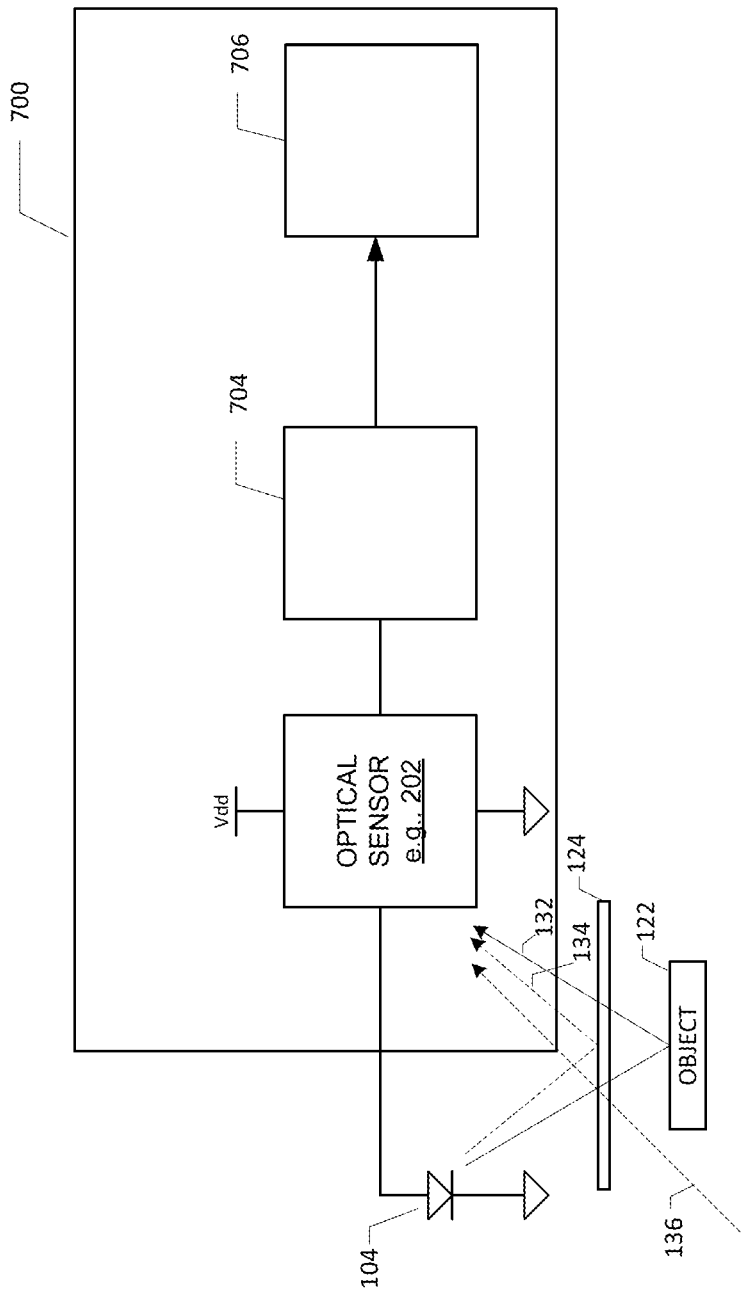
FIG. 7 shows an exemplary system including an optical sensor of an embodiment of the present invention.

Optical sensors of embodiments of the present invention can be used in various systems, including, but not limited to, mobile phones, tablets, personal data assistants, laptop computers, netbooks, other handheld-devices, as well as non-handheld-devices. Referring to the system 700 of FIG. 7, for example, the optical sensor (e.g., 202) can be used to control whether a subsystem 706 (e.g., a touch-screen, display, backlight, virtual scroll wheel, virtual keypad, navigation pad, etc.) is enabled or disabled. For example, the optical sensor can detect when an object, such as a person's finger, is approaching, and based on the detection either enable (or disable) a subsystem 706. More specifically, an output of the optical sensor (e.g., 202) can be provided to a comparator or processor 704 which can, e.g., compare the output of the optical sensor to a threshold, to determine whether the object is within a range where the subsystem 706 should be enabled (or disabled, depending on what is desired). Multiple thresholds (e.g., stored digital values) can be used, and more than one possible response can occur based on the detected proximity of an object. For example, a first response can occur if an object is within a first proximity range, and a second response can occur if the object is within a second proximity range. Exemplary responses can include starting or stopping, or enabling or disabling, various system and/or subsystem operations.

Embodiments of the present invention, which are described above, can be used to reduce and potentially eliminate the adverse affects that interference light and ambient light may have on an optical sensor. As explained above, interference light may be caused by specular reflections and/or other internal reflections and/or light leaking under, over and/or through a barrier (e.g., 110). Embodiments of the present invention can be used to compensate for imperfections in a light barrier (e.g., 110), which may occur during manufacture of the light barrier, and/or may result from the system including the optical sensor being dropped or otherwise jolted, which may damage or dislodge the light barrier. Embodiments of the present invention can also be used to eliminate the need for any light barrier at all. Further, embodiments of the present invention can compensate for variations in interference light that are due to changing smudges, makeup, oil and/or other contaminants on the outer surface of a cover plate that covers an optical sensor. While embodiments of the present invention can be used to reduce the adverse affects of specular reflections and other reflections caused by a cover plate (e.g., 124), it is noted that optical sensors according to embodiments of the present invention can be used without a cover plate.

Figure 8:
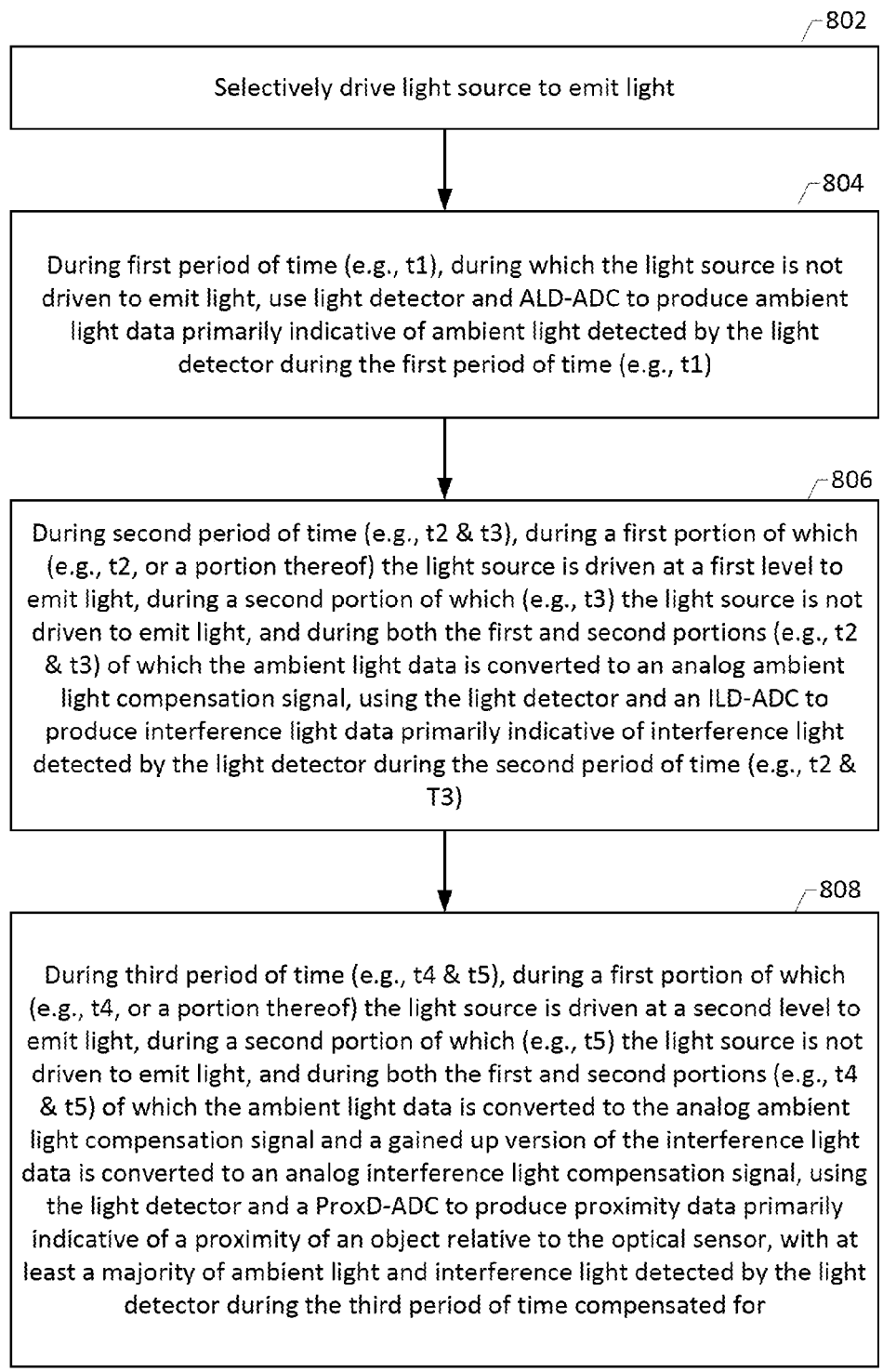
FIG. 8 is a high level flow diagram that is used to summarize methods according to certain embodiments of the present invention.

The high level flow diagram of FIG. 8 will now be used to summarize methods according to specific embodiments of the present invention that are for use with an optical sensor (e.g., 202) including a light detector (e.g., 114) and including and/or for use with a light source (e.g., 104). Referring to FIG. 8, step 802 involves selectively driving the light source to emit light. Step 802 can be performed, e.g., using a driver (e.g., 106) that is controlled by a controller (e.g., 108 or 208). Such methods can be used, e.g., to detect proximity, presence and/or motion of an object (e.g., 122) relative to the optical sensor (e.g., 202).

Still referring to FIG. 8, step 804 involves, during a first period of time (e.g., t1 in FIG. 3), during which the light source is not driven to emit light, using the light detector and an ambient light detection (ALD) analog-to-digital converter (ADC) (e.g., 216a) to produce ambient light data primarily indicative of ambient light detected by the light detector during the first period of time (e.g., t1 in FIG. 3).

Step 806 involves, during a second period of time (e.g., t2 & t3 collectively in FIG. 3), during a first portion of which (e.g., t2, or a portion thereof) the light source is driven at a first level to emit light, during a second portion of which (e.g., t3) the light source is not driven to emit light, and during both the first and second portions (e.g., t2 & t3) of which the ambient light data is converted to an analog ambient light compensation signal (e.g., by the ambient light detection DAC 218a), using the light detector and an interference light detection (ILD) analog-to-digital converter (ADC) (e.g., 216b) to produce interference light data primarily indicative of interference light detected by the light detector (e.g., 114) during the second period of time (e.g., t2 & t3).

Step 808 involves, during a third period of time (e.g., t4 & t5 collectively in FIG. 3), during a first portion of which (e.g., t4, or a portion thereof) the light source is driven at a second level (which is greater than the first level) to emit light, during a second portion of which (e.g., t5) the light source is not driven to emit light, and during both the first and second portions (e.g., t4 & t5) of which the ambient light data is converted to the analog ambient light compensation signal (e.g., by the ambient light detection DAC 218a) and a gained up version of the interference light data is converted to an analog interference light compensation signal, using the light detector and a proximity detection (ProxD) analog-to-digital converter (ADC) (e.g., 216c) to produce proximity data primarily indicative of a proximity of an object relative to the optical sensor, with at least a majority of ambient light and interference light detected by the light detector during the third period of time compensated for.

As explained above, the ALD-ADC, the ILD-ADC and the ProxD-ADC can actually be implemented using the same ADC circuitry (or much of the same ADC circuitry) with a 1:3 demultiplexer at the output of the ADC circuitry, to provide the output of the ADC to the appropriate signal path. More generally, at least a portion of the ALD-ADC, at least a portion of the ILD-ADC and at least a portion of the ProxD-ADC can be implemented using the same ADC circuitry.

In accordance with certain embodiments, the ALD-ADC comprises an M-bit ADC and the ambient light data comprise M-bits of data, the ILD-ADC comprises an L-bit ADC and the interference light data comprises L-bits of data, and the ProxD-ADC comprise an N-bit ADC and the proximity data comprises N-bits of data, wherein N≥M≥L. Different resolutions can be achieved, e.g., by changing the number of clock cycles used to perform each analog-to-digital conversion and changing the reference currents provided to the ADC circuitry, but is not limited thereto.

In accordance with certain embodiments, step 804 includes storing (e.g., in a latch or register) the ambient light data primarily indicative of the intensity of ambient light detected by the light detector during the first period.

In accordance with certain embodiments, step 806 includes using an ambient light compensation digital-to-analog converter (DAC) (e.g., 218a) to convert the ambient light data, stored at step 802, to the analog ambient light compensation signal.

In accordance with certain embodiments, step 806 includes storing (e.g., in a latch or register) the interference light data primarily indicative of the intensity of interference light detected by the light detector during the second period of time.

In accordance with certain embodiments, step 808 includes using the ambient light compensation DAC (e.g., 218a) to convert the M-bits of data, stored at step 804, to the analog ambient light compensation signal. Step 808 can also include using an interference light compensation DAC (e.g., 218b) to convert the gained up version of the interference data, stored at step 806, to the analog interference light compensation signal.

In accordance with certain embodiments, step 808 includes subtracting the analog ambient light compensation signal and the analog interference light compensation signal, from an analog signal produced by the light detector during the third period of time, upstream of the ProxD ADC (e.g., 216c), as can be appreciated from FIG. 2.

In accordance with certain embodiments, at least one of steps 806 or 808 includes using a gain factor to increase a value of interference light data, stored at step 806, to the gained up version of the interference light data, prior to using the interference light compensation DAC (e.g., 218b) to convert the gained up version of the interference light data to the analog interference light compensation signal.

In accordance with certain embodiments, step 808 involves, during the first portion (e.g., t2 in FIG. 3) of the second period of time (e.g., t2 & t3 collectively in FIG. 3), during which the light source is driven at the first level to emit light, incrementing a first count value. Further, step 808 can involve during the second portion (e.g., t3) of the second period of time (e.g., t2 & t3), during which the light source is not driven to emit light, decrementing the first count value so that at an end of the second period of time a final value of the first count value, which is the interference light data, is indicative of the interference light that was incident on the light detector during the second period of time (e.g., t2 & t3) with at least a majority of the ambient light that was incident on the light detector during the second period of time compensated for, and is thereby primarily indicative of the interference light detected by the light detector during the second period of time (e.g., t2 & t3).

In accordance with certain embodiments, step 810 involves, during the first portion (e.g., t4) of the third period of time (e.g., t4 & t5 collectively), during which the light source is driven at the second level to emit light, incrementing a second count value. Step 810 can also involve, during the second portion (e.g., t5) of the third period of time (e.g., t4 & t5), during which the light source is not driven to emit light, decrementing the second count value so that at an end of the third period of time a final value of the third count value, which is the proximity data, is primarily indicative of the proximity of the object relative to the optical sensor, with at least a majority of the ambient light and the interference light detected by the light detector during the third period of time compensated for.

In accordance with certain embodiments, step 808 involves, during the third period of time (e.g., t4 & t5), using the light detector to produce an analog light detection signal indicative of a sum of ambient light that is incident on the light detector during the third period of time, interference light that is incident on the light detector during the third period of time, and light of interest that is incident on the light detector during the first portion, but not the second portion, of the third period of time. In such embodiments, the light of interest comprises a portion of the light emitted by the light source (e.g., 104) that reflected off an object (e.g., 122) and is incident on the light detector (e.g., 114). Step 808 can also involve subtracting the analog ambient light compensation signal and the analog interference light compensation signal from the analog light detection signal, upstream of the ProxD ADC (e.g., 216c), so that an output of the ProxD is the proximity data indicative of the proximity of the object relative to the optical sensor with at least a majority of the ambient light and the interference light incident thereon during the third period of time compensated for. In the specific embodiments described with reference to the timing diagram of FIG. 4, a first portion of the interference light compensation is performed upstream of the Prox ADC (e.g., 216c), and a second portion of the interference light compensation is performed downstream of the Prox ADC (e.g., 216c).

In accordance with certain embodiments, when the light source is driven at the first level, an amount of light emitted by the light source is sufficient to cause the light detector to detect interference light, but is insufficient to reflect off an object that is external to the optical sensor and is within a sense region of the optical sensor. In comparison, when the light source is driven at the second level, the amount of light emitted by the light source is sufficient to reflect off an object (e.g., 122) that is external to the optical sensor and is within the sense region of the optical sensor.

In accordance with certain embodiments, a gain factor, which is used to produce the gained up version of the interference light data, is used to adjust for an amount of interference light being greater when the light source is driven at the second level compared to when the light source is driven at the first level.

Explained another way, in accordance with certain embodiments of the present invention, while a light source is not emitting light, an amount of ambient light that is incident on a light detector is used to produce ambient light detection data indicative thereof. Further, while the light source is emitting a first level of light, which is sufficient to cause the light detector to detect interference light but is insufficient to reflect off an object that is external to the optical sensor and is within the sense region of the optical sensor, interference light is detected and information indicative thereof is saved. While the light source is emitting a second level of light, which is sufficient to reflect off an object that is external to the optical sensor that is within the sense region of the optical sensor, an ambient light compensation signal is produced based on the ambient light detection data, an interference light compensation signal is produced based on the interference light detection data, and light of interest (that is incident on the light detector) is detected and proximity detection data indicative thereof is output. The light of interest is caused by light that reflects off the object that is external to the optical sensor that is within the sense region of the optical sensor and producing proximity data indicative thereof. In such embodiments, the ambient light compensation signal and the interference light compensation signal compensate for ambient light and interference light that are incident on the light detector while the light source is emitting the second level of light, thereby causing the proximity detection data to be primarily indicative of the proximity of the object relative to the optical sensor, with at least a majority of ambient light and interference light detected by the light detector compensated for.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. A method for use with an optical sensor including a light detector, the optical sensor for use with a light source that may or may not be part of the optical sensor, the method comprising:
   (a) selectively driving the light source to emit light;
   (b) during a first period of time, during which the light source is not driven to emit light, using the light detector and an ambient light detection analog-to-digital converter (ALD-ADC) to produce ambient light data primarily indicative of ambient light detected by the light detector during the first period of time;
   (c) during a second period of time, during a first portion of which the light source is driven at a first level to emit light, during a second portion of which the light source is not driven to emit light, and during both the first and second portions of which the ambient light data is converted to an analog ambient light compensation signal, using the light detector and an interference light detection analog-to-digital converter (ILD-ADC) to produce interference light data primarily indicative of interference light detected by the light detector during the second period of time; and
   (d) during a third period of time, during a first portion of which the light source is driven at a second level to emit light, during a second portion of which the light source is not driven to emit light, and during both the first and second portions of which the ambient light data is converted to the analog ambient light compensation signal and a gained up version of the interference light data is converted to an analog interference light compensation signal, using the light detector and a proximity detection analog-to-digital converter (ProxD-ADC) to produce proximity data primarily indicative of a proximity of an object relative to the optical sensor, with at least a majority of ambient light and interference light detected by the light detector during the third period of time compensated for, wherein the second level is greater than the first level.

2. The method of claim 1, wherein at least a portion of the ALD-ADC, at least a portion of the ILD-ADC and at least a portion of the ProxD-ADC comprise same ADC circuitry.

3. The method of claim 1, wherein:
   the ALD-ADC comprises an M-bit ADC and the ambient light data comprise M-bits of data;
   the ILD-ADC comprises an L-bit ADC and the interference light data comprises L-bits of data;
   the ProxD-ADC comprise an N-bit ADC and the proximity data comprises N-bits of data;
   N, M and L are each integer values indicative of a number of bits of resolution of an ADC; and
   $N \geq M \geq L$.

4. The method of claim 3, wherein at least a portion of the M-bit ADC, at least a portion of the L-bit ADC and at least a portion of the N-bit ADC comprise same ADC circuitry.

5. The method of claim 1, wherein:
   step (b) includes storing the ambient light data primarily indicative of the intensity of ambient light detected by the light detector during the first period;
   step (c) includes
      using an ambient light compensation digital-to-analog converter (DAC) to convert the ambient light data, stored at step (b), to the analog ambient light compensation signal, and
      storing the interference light data primarily indicative of the intensity of interference light detected by the light detector during the second period of time;
   step (d) includes
      using the ambient light compensation DAC to convert the M-bits of data, stored at step (b), to the analog ambient light compensation signal,
      using an interference light compensation DAC to convert the gained up version of the interference data, stored at step (c), to the analog interference light compensation signal, and
      subtracting the analog ambient light compensation signal and the analog interference light compensation signal, from an analog signal produced by the light detector during the third period of time, upstream of the ProxD ADC.

6. The method of claim 5, wherein at least one of steps (c) and (d) includes using a gain factor to increase a value of interference light data, stored at step (c), to the gained up version of the interference light data, prior to using the interference light compensation DAC to convert the gained up version of the interference light data to the analog interference light compensation signal.

7. The method of claim 1, wherein at step (c):
during the first portion of the second period of time, during which the light source is driven at the first level to emit light, incrementing a first count value; and
during the second portion of the second period of time, during which the light source is not driven to emit light, decrementing the first count value so that at an end of the second period of time a final value of the first count value, which is the interference light data, is indicative of the interference light that was incident on the light detector during the second period of time with at least a majority of the ambient light that was incident on the light detector during the second period of time compensated for, and is thereby primarily indicative of the interference light detected by the light detector during the second period of time.

8. The method of claim 7, wherein at step (d):
during the first portion of the third period of time, during which the light source is driven at the second level to emit light, incrementing a second count value; and
during the second portion of the third period of time, during which the light source is not driven to emit light, decrementing the second count value so that at an end of the third period of time a final value of the third count value, which is the proximity data, is primarily indicative of the proximity of the object relative to the optical sensor, with at least a majority of the ambient light and the interference light detected by the light detector during the third period of time compensated for.

9. The method of claim 1, wherein step (d) includes:
during the third period of time, using the light detector to produce an analog light detection signal indicative of a sum of
ambient light that is incident on the light detector during the third period of time,
interference light that is incident on the light detector during the third period of time, and
light of interest that is incident on the light detector during the first portion, but not the second portion, of the third period of time, wherein the light of interest comprises a portion of the light emitted by the light source that reflected off an object and is incident on the light detector; and
subtracting the analog ambient light compensation signal and the analog interference light compensation signal from the analog light detection signal, upstream of the ProxD ADC, so that an output of the ProxD is the proximity data indicative of the proximity of the object relative to the optical sensor with at least a majority of the ambient light and the interference light incident thereon during the third period of time compensated for.

10. The method of claim 1, wherein:
when the light source is driven at the first level, an amount of light emitted by the light source is sufficient to cause the light detector to detect interference light, but is insufficient to reflect off an object that is external to the optical sensor and is within a sense region of the optical sensor;
when the light source is driven at the second level, the amount of light emitted by the light source is sufficient to reflect off an object that is external to the optical sensor and is within the sense region of the optical sensor;
wherein a gain factor, which is used to produce the gained up version of the interference light data, is used to adjust for an amount of interference light being greater when the light source is driven at the second level compared to when the light source is driven at the first level.

11. An optical sensor, comprising:
a driver adapted to selectively drive a light source to emit light;
a light detector adapted to produce an analog light detection signal indicative of an intensity of light detected by the light detector, wherein the light detected by the light detector can include at least one of ambient light, interference light or light of interest, the light of interest being light emitted by the light source that reflected off an object and is incident on the light detector;
an M-bit analog-to-digital converter (ADC);
an L-bit ADC;
an N-bit ADC;
an ambient light compensation digital-to-analog converter (DAC);
an interference light compensation DAC; and
a controller adapted to control the driver, the M-bit ADC, the L-bit-ADC, the N-bit ADC, the ambient light compensation DAC, and the interference light compensation DAC so that:
during a first period of time, during which the light source is not driven by the driver to emit light, the light detector and the M-bit ADC produce M-bits of data primarily indicative of ambient light detected by the light detector during the first period of time;
during a second period of time, during a first portion of which the light source is driven by the driver at a first level to emit light, during a second portion of which the light source is not driven by the driver to emit light, and during both the first and second portions of which the M-bits of data are converted to an analog ambient light compensation signal by the ambient light compensation DAC, the light detector and the L-bit ADC produce L-bits of data primarily indicative of interference light detected by the light detector during the second period of time; and
during a third period of time, during a first portion of which the light source is driven by the driver at a second level to emit light, during a second portion of which the light source is not driven by the driver to emit light, and during both the first and second portions of which the M-bits of data are converted to the analog ambient light compensation signal by the ambient light compensation DAC and a gained up version of the L-bits of data are converted to an analog interference light compensation signal by the interference light compensation DAC, the light detector and the N-bit ADC produce N-bits of data primarily indicative of a proximity of an object relative to the optical sensor, with at least a majority of ambient light and interference light detected by the light detector during the third period of time compensated for, wherein the second level is greater than the first level;
wherein N, M and L are each integer values indicative of a number of bits of resolution of an ADC.

12. The optical sensor of claim 11, wherein inputs of the M-bit ADC, the L-bit ADC and the N-bit ADC, and outputs of the ambient light compensation DAC and the interference light compensation DAC, are all coupled to a same node to which a terminal of the light detector is also coupled.

13. The optical sensor of claim 11, wherein $N \geq M \geq L$.

14. The optical sensor of claim 11, wherein at least a portion of the M-bit ADC, at least a portion of the L-bit ADC and at least a portion of the N-bit ADC comprise same ADC circuitry.

15. The optical sensor of claim 11, wherein:
when the light source is driven at the first level, an amount of light emitted by the light source is sufficient to cause the light detector to detect interference light, but is insufficient to reflect off an object that is external to the optical sensor and is within a sense region of the optical sensor;
when the light source is driven at the second level, the amount of light emitted by the light source is sufficient to reflect off an object that is external to the optical sensor and is within the sense region of the optical sensor; and
a gain factor, which is used to produce the gained up version of the L-bits of data, is used to adjust for an amount of interference light being greater when the light source is driven at the second level compared to when the light source is driven at the first level.

16. The optical sensor of claim 15, wherein L-bits of data are stored in a first register, the gain factor is stored in second register, and results of multiplying the L-bits of data by the gain factor are stored in a third register, which results are the gained up version of the L-bits of data.

17. A method for use with an optical sensor including a light detector, the optical sensor for use with a light source that may or may not be part of the optical sensor, the method comprising:
(a) detecting an amount of ambient light that is incident on the light detector and producing ambient light detection data indicative thereof,
wherein step (a) is performed during a first period of time during which the light source is not emitting light;
(b) detecting interference light and producing interference light detection data indicative thereof,
wherein step (b) is performed during a second period of time, during at least a portion of which the light source is emitting a first level of light, which is sufficient to cause the light detector to detect interference light but is insufficient to reflect off an object that is external to the optical sensor and is within a sense region of the optical sensor; and
(c) producing an ambient light compensation signal based on the ambient light detection data, producing an interference light compensation signal based on the interference light detection data, and while the ambient light compensation signal and the interference light compensation signal are being produced, detecting light of interest that is incident on the light detector and outputting proximity detection data indicative thereof,
wherein step (c) is performed during a third period of time, during at least a portion of which the light source is emitting a second level of light, which is sufficient to reflect off an object that is external to the optical sensor and is within the sense region of the optical sensor;
wherein the light of interest is caused by light the reflects off an object that is external to the optical sensor and is within the sense region of the optical sensor.

18. The method of claim 17, wherein the ambient light compensation signal and the interference light compensation signal compensate for ambient light and interference light that are incident on the light detector while the light source is emitting the second level of light, thereby causing the proximity detection data to be primarily indicative of the proximity of the object relative to the optical sensor, with at least a majority of ambient light and interference light detected by the light detector compensated for.

19. The method of claim 17, further comprising selectively enabling or disabling a sub-system based on the proximity detection data.

* * * * *

UNITED STATES PATENT AND TRADEMARK OFFICE
CERTIFICATE OF CORRECTION

PATENT NO.         : 9,642,215 B2
APPLICATION NO.    : 15/040434
DATED              : May 2, 2017
INVENTOR(S)        : Nikhil Verma It is certified that error appears in the above-identified patent and that said Letters Patent is hereby corrected as shown below:

In the Drawings

In Fig. 4, Sheet 4 of 8, delete "Prox. Detec. ADC 216a" and insert -- Prox. Detec. ADC 216c --, therefor.

In Fig. 6, Sheet 6 of 8, delete "iref" and insert -- Iref --, therefor.

In Fig. 8, Sheet 8 of 8, for Tag "806", in Line 9, delete "T3)" and insert -- t3) --, therefor.

In the Specification

In Column 2, Line 47, delete "methods" and insert -- methods, --, therefor.

In Column 6, Line 1, delete "$F_{gain}$" and insert -- ($F_{gain}$) --, therefor.

In Column 6, Line 7, delete "and or" and insert -- and/or --, therefor.

In Column 6, Line 17, delete "ILC-DAC" and insert -- ILC-ADC --, therefor.

In Column 7, Line 49, delete "ProxD-ADCc 216" and insert -- ProxD-ADC 216c --, therefor.

In Column 7, Line 62, delete "during" and insert -- operation during --, therefor.

In Column 8, Line 41, delete "during with" and insert -- during which --, therefor.

In Column 8, Lines 48-49, delete "during with" and insert -- during which --, therefor.

In Column 10, Line 44, delete "[(Iabc1" and insert -- [(Iadc1 --, therefor.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,642,215 B2

In Column 10, Line 56, delete "Irefl" and insert -- IrefL --, therefor.

In Column 11, Line 6, delete "[(Iabc1" and insert -- [(Iadc1 --, therefor.

In Column 11, Line 9, delete "irefL" and insert -- IrefL --, therefor.

In Column 11, Line 17, delete "of is" and insert -- of 1s --, therefor.

In Column 11, Line 41, delete "the is" and insert -- that is --, therefor.

In Column 12, Line 53, delete "detection DAC" and insert -- compensation DAC --, therefor.

In Column 12, Line 67, delete "detection DAC" and insert -- compensation DAC --, therefor.

In Column 14, Line 51, delete "Prox" and insert -- ProxD --, therefor.

In Column 14, Line 53, delete "Prox" and insert -- ProxD --, therefor.

In the Claims

In Column 18, Line 23, in Claim 11, delete "L-bit-ADC," and insert -- L-bit ADC, --, therefor.

In Column 19, Line 25, in Claim 16, delete "are the" and insert -- in --, therefor.

In Column 20, Line 23, in Claim 17, delete "by light the reflects" and insert -- by light that reflects --, therefor.